(12) United States Patent
Haupt et al.

(10) Patent No.: US 10,253,873 B2
(45) Date of Patent: Apr. 9, 2019

(54) VALVE FOR LOCKING AND RELEASING A HYDRAULICALLY ACTUATED SHIFTING ELEMENT

(71) Applicant: ZF Friedrichshafen AG, Friedrichshafen (DE)

(72) Inventors: Josef Haupt, Tettnang (DE); Martin Brehmer, Tettnang (DE); Stefan Brom, Friedrichshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 666 days.

(21) Appl. No.: 14/832,151

(22) Filed: Aug. 21, 2015

(65) Prior Publication Data

US 2016/0053886 A1    Feb. 25, 2016

(30) Foreign Application Priority Data

Aug. 21, 2014   (DE) .................. 10 2014 216 581

(51) Int. Cl.
*F16H 61/00*    (2006.01)
*F16H 61/02*    (2006.01)
*F16K 31/524*    (2006.01)

(52) U.S. Cl.
CPC ..... *F16H 61/0265* (2013.01); *F16H 61/0009* (2013.01); *F16H 61/0267* (2013.01); *F16K 31/524* (2013.01)

(58) Field of Classification Search
CPC ............ F16H 61/0009; F16H 61/0265; F16H 61/0267; F16D 25/14; F16D 48/02; F16D 2048/0221; F16K 31/524; F16K 31/52425

USPC ................. 74/335; 192/85.24, 85.3; 251/263
See application file for complete search history.

(56) References Cited

U.S. PATENT DOCUMENTS 3,343,564 A  *  9/1967  Peeples ................. F16K 15/044
                                                        137/539
4,927,213 A     5/1990  Burgdore
6,544,139 B1    4/2003  Gierer et al.

FOREIGN PATENT DOCUMENTS

| DE | 33 40 698 | * | 5/1985 |
| DE | 3808902 C2 | | 10/1989 |
| DE | 19503622 | | 8/1996 |
| DE | 19858541 A1 | | 6/2000 |
| DE | 10 2004 032652 | | 4/2005 |
| DE | 10 2006 024183 | | 11/2007 |
| JP | 2010-242852 | * | 10/2010 |
| JP | 2012-224290 | * | 11/2012 |

OTHER PUBLICATIONS

German Patent Office Search Report, dated Jul. 16, 2015.
German Search Report DE102014216581.4 dated Jul. 13, 2015. (8 pages).

* cited by examiner

*Primary Examiner* — William C Joyce
(74) *Attorney, Agent, or Firm* — Dority & Manning, P.A.

(57) ABSTRACT

A stop valve assembly is provided for the locking and unlocking of at least one hydraulic chamber of a shift element that is applied with operating pressure and is coaxially arranged at a shaft in a transmission housing of an automatic transmission of a motor vehicle. At least one first stop valve for lowering the operating pressure of the shift element and at least one second stop valve for raising the operating pressure of the shift element are provided.

14 Claims, 2 Drawing Sheets

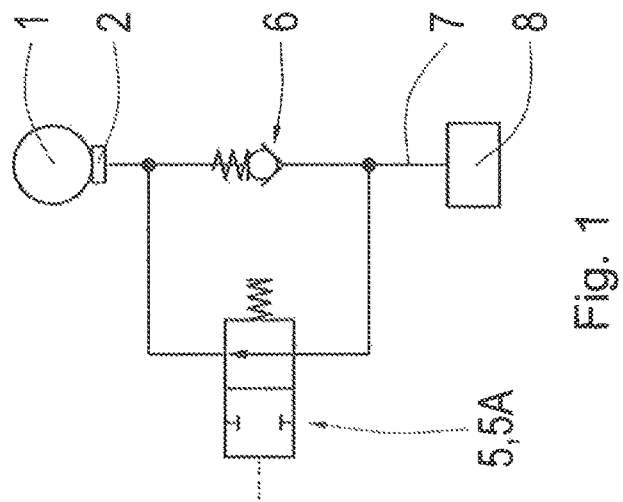
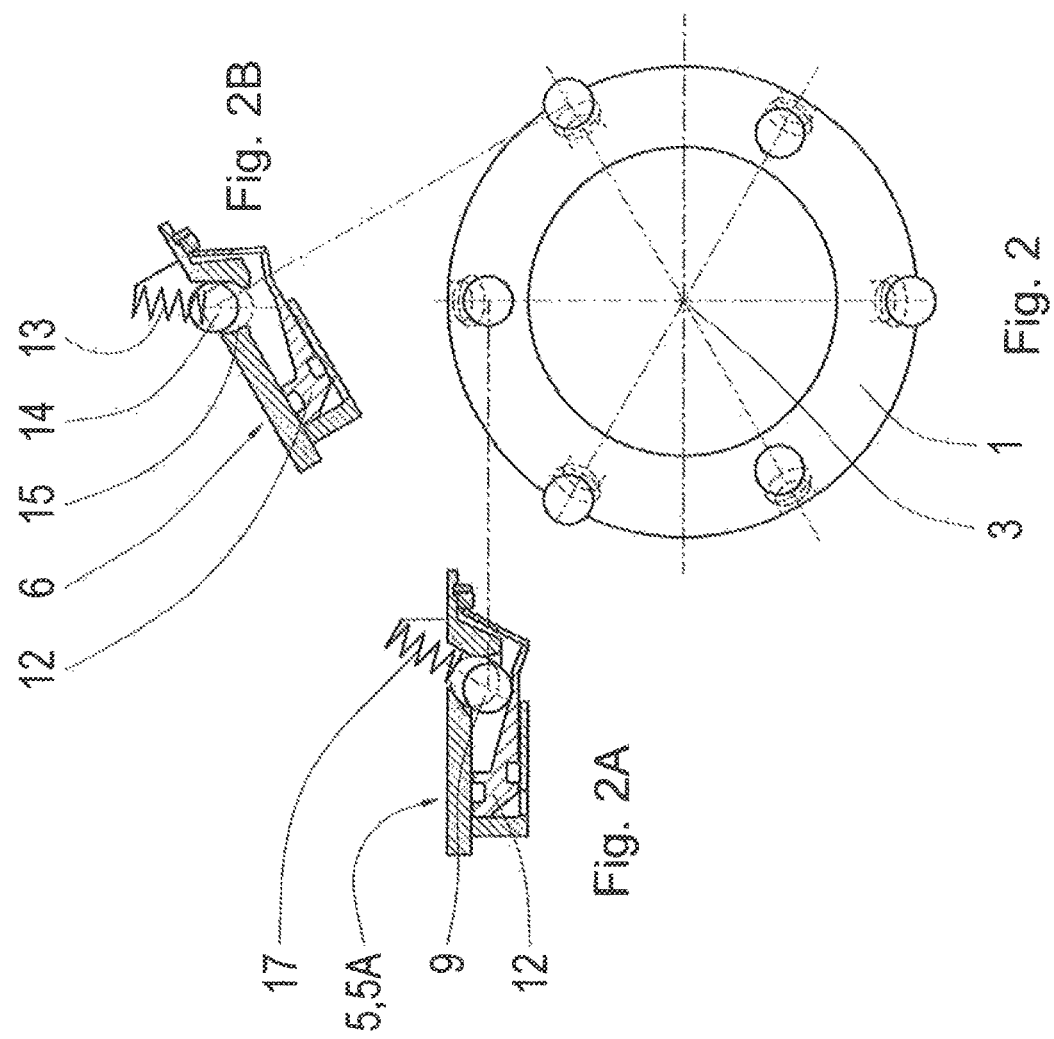

VALVE FOR LOCKING AND RELEASING A HYDRAULICALLY ACTUATED SHIFTING ELEMENT

FIELD OF THE INVENTION

The present invention relates to a stop valve assembly for the locking and unlocking of at least one hydraulic chamber of a shift element that is applied with operating pressure and which is coaxially arranged at a shaft in a transmission housing of an automatic transmission of a motor vehicle.

BACKGROUND

Shift elements (such as clutches, brakes or the like) are closed and opened in automatic transmissions (such as those known from DE 198 58 541 A1) typically by means of hydraulically actuated pistons, with corresponding operating pressure in the hydraulic chamber. The conducting of pressure oil in the transmission housing to the hydraulic chamber or the clutch piston takes place through rotating elements, which are sealed by means of gap seals, such as slide bearings and rectangular rings. Particularly with high clutch pressures (for example, during the shifting position of the clutch), such rotary feedthroughs are characterized by high losses as a result of leaks. In order to prevent leakage losses (for example, with closed, thus actuated, shift elements or clutches), locking mechanisms, which are controlled depending on the operating pressure, are known. However, these are expensive in terms of installation space, and are thus not neutral either regarding weight or costs.

SUMMARY OF THE INVENTION

The present invention is subject to a task of proposing a stop valve assembly of the type described above that is able to be integrated in the shift element as neutral as possible in terms of installation space and weight, and is able to be controlled independent of the operating pressure. Additional objects and advantages of the invention will be set forth in part in the following description, or may be obvious from the description, or may be learned through practice of the invention.

The problems are solved by the characteristics of a step valve assembly as set forth herein.

Thus, a stop valve assembly for the locking and unlocking of at least one hydraulic chamber of a shift element subject to operating pressure, for example a frictional-locking or a similar shift element, preferably a brake or a clutch, is proposed. The shift element is preferably coaxially arranged at a shaft in a transmission housing of an automatic transmission of a motor vehicle. With the locking, the hydraulic chamber of the shift element is locked, in order to reduce the activation energy outside of shifting processes.

With the stop valve assembly in accordance with the invention, at least one first stop valve for lowering the operating pressure of the shift element and at least one second stop valve for raising the operating pressure of the shift element are provided. With the splitting, in accordance with the invention, of the stop valve assembly into at least two different valve types, there can be a realization of not only a functionally reliable operation, but also an integration that is neutral in terms of installation space and weight, of the arrangement into the shift element or transmission housing. In addition, the proposed stop valve assembly is able to be controlled independent of the operating pressure.

Various types of valves, such as ball valves or the like, may be used as the stop valve. In principle, the first stop valve serves the purpose of opening the hydraulic chamber of the shift element subject to operating pressure, and thus lowering the operating pressure. The lowering may take place, for example, for the full degassing of the hydraulic chamber in the event of the failure of the transmission. It is also possible to carry out a selective lowering of the clutch pressure for the corresponding control of the shift element through one or more first stop valves. For example, a ball valve, the locking element of which is lockable through a ramp contour, can be used as the first stop valve.

The second type of stop valve serves the purpose of filling the hydraulic chamber of the shift element, and thus raising the operating pressure. Preferably, simple non-return ball valves can be used, in principle, these prevent the lowering of the operating pressure and open only upon the desired raising of the operating pressure, such that hydraulic agents are able to flow into the hydraulic chamber of the shift element. If the operating pressure from the hydraulic control unit is greater than the pressure in the hydraulic chamber of the shift element, the second stop valve opens. As a result, with one or more second stop valves, the hydraulic chamber of the shift element can be filled or refilled.

The various types of stop valves are preferably arranged in a distributed manner around the circumference, and their arrangement forms a ring shape on the shift element. Thus, stop valves for a ring application are realized by means of the ball ramp principle. According to a preferred design, the first and second stop valves are preferably alternately arranged in a manner axially offset to one another by 60 degrees, such that, in each case, three first stop valves and three second stop valves are provided.

The roughly ring-shaped arrangement of the first and second stop valves brings about, among other things, the design advantage that rotationally symmetrical components are usable. For example, common components that are designed in roughly ring shapes can be used for the first and second valves. This applies, for example, to the valve seats that are fitted on a ring-shaped component at the corresponding circumferential position for the first and second valves. In addition, a ring-shaped component also arises as the actuating piston, with which the ramp contour is formed by tapered ramp-shaped form. For example, preferably, a conical component may be provided as the actuating piston.

Preferably, the stop valve assembly in accordance with the invention may be used with frictional-locking shift elements, such as multi-disk clutches or multi-disk brakes.

BRIEF DESCRIPTION OF THE DRAWINGS

In the following, the present invention is further described on the basis of the drawings. The following is shown:

FIG. 1 is a schematic view of a stop valve arrangement for the locking and unlocking of a shift element actuated by means of operating pressure;

FIG. 2 is a cross-cut view through the shift element with the stop valve arrangement in accordance with the invention;

FIG. 2A is a schematic cross-cut view of a first stop valve of the stop valve arrangement in accordance with the invention;

FIG. 2B is a schematic cross-cut view of a second stop valve of the stop valve arrangement;

DETAILED DESCRIPTION

Figure 3:
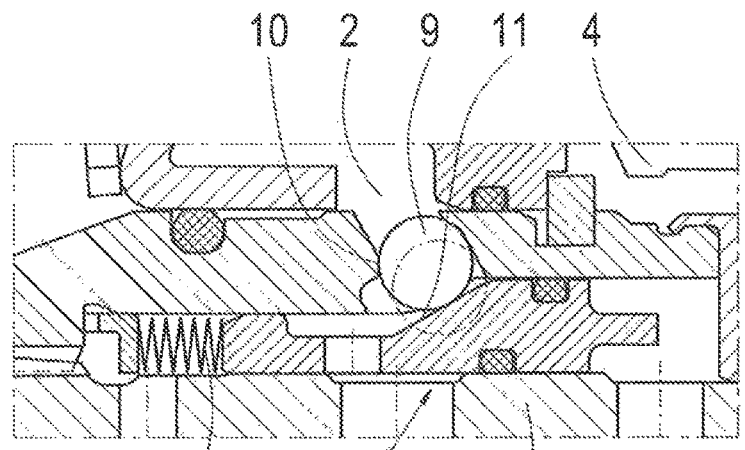
FIG. 3 is a schematically enlarged cross-cut through the first stop valve as a normally open variant.

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

FIGS. 1 to 5 show different views and arrangements of a stop valve assembly in accordance with the invention for the locking or unlocking of at least one hydraulic ring chamber 2 of a shift element 1 subject to operating pressure. The shift element is preferably designed as a clutch 1 and is arranged roughly coaxially to a shaft or a transmission shaft 3 in a transmission housing 4 of an automatic transmission of a motor vehicle. The stop valve assembly comprises several first stop valves 5, 5A for lowering the operating pressure of the shift element 1 and several second stop valves 6 for raising the operating pressure of the shift element 1.

As can be seen in FIG. 1, the first stop valve 5, 5A and the second stop valve 6 in the supply line 7 are switched in a manner parallel to each other between the hydraulic control unit or control valve 8 and the hydraulic chamber 2 of the shift element 1.

The first stop valve 5, 5A has a locking element 9, such as a ball, which is in operative connection with, on the one hand, a valve seat 10 and, on the other hand, a ring-shaped actuating piston 12, 12A. On a side turned towards the locking element 9, the actuating piston 12, 12A includes a ramp contour 11, for example as a tapered ramp. The angle of the ramp contour 11 is selected as roughly between 20 and 40 degrees. For the axial movement of the actuating piston 12, 12A, on the one hand, the actuating piston 12, 12A is subject to a control pressure and, on the other hand, the actuating piston 12, 12A is in operative connection with a return spring 16.

The second stop valve 6 is designed as a non-return ball valve, with which a locking ball 14 applied with a non-return spring 13 is pressed against a valve seat 15. As a result, through the second stop valve 6, the hydraulic chamber 2 of the shift element 1 can be filled and refilled with clutch pressure.

As can be seen in particular from FIGS. 2, 2A and 2B, preferably, three first stop valves 5, 5A and three second stop valves 6 are arranged in a distributed manner around the circumference of the shift element 1. Thereby, the individual stop valves 5, 5A and 6 are alternately arranged in a manner axially offset at an angle of 60 degrees around the circumference. The stop valves 5, 5A, 6 shown in FIGS. 2A and 2B are presented in a cut manner at the positions marked with connection lines in FIG. 2.

Figure 4:
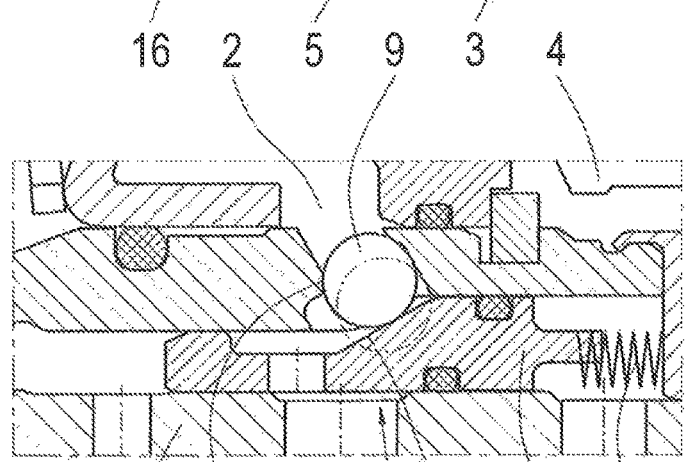
FIG. 4 is a schematically enlarged cross-cut through the first stop valve as a normally closed variant.
Figure 5:
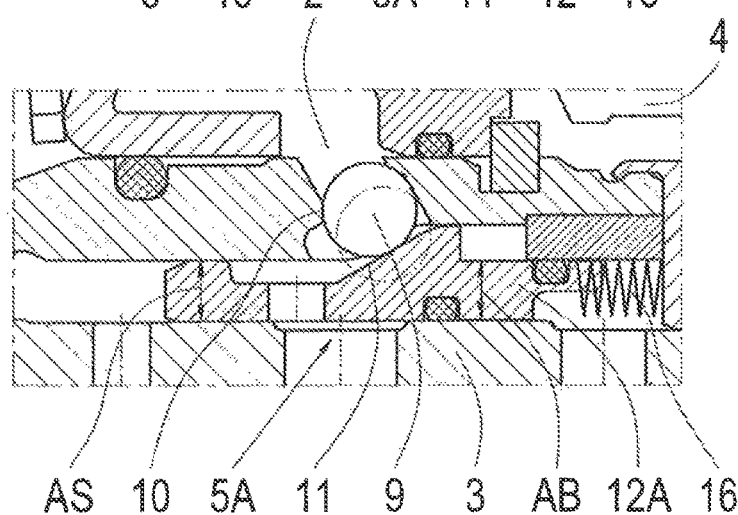
FIG. 5 is an alternative cross-cut view through the first stop valve as a normally closed variant.

Different variants of the first stop valve 5, 5A are shown in FIGS. 3 to 5. FIG. 3 shows the first stop valve 5 as a so-called "normally open variant," while FIGS. 4 and 5 show different designs of the first stop valve 5A as so-called "normally closed variants."

With the first stop valve 5 presented in FIG. 3, as a variant designed to be normally open, the actuating piston 12 is able to be subject to control pressure in such a manner that the spring-loaded locking element 9 is, for the locking of the hydraulic chamber 2 of the shift element 1, able to be pressed against the valve seat 10. The lowering of the operating pressure is achieved by the fact that, upon a lack of control pressure, the locking element 9 can be brought by the resetting force of the spring element 16 acting on the actuating piston 12 into the open position of the first stop valve 5.

In FIGS. 4 and 5, the first stop valve 5A is designed as a normally closed variant. In contrast to the view in accordance with FIG. 3, with the design in accordance with FIG. 4, it is provided that, with the actuating piston 12, the application of control pressure and the return spring 16 is reversed. Thus, the actuating piston 12 is able to be subject to the spring force of the spring element 16 in such a manner that the locking element 9 for the locking of the hydraulic chamber 2 of the shift element 1 is able to be pressed against the valve seat 10. For the lowering of the operating pressure, the actuating piston 12 must be subject to control pressure, such that the locking device 9 can be brought into an open position of the stop valve 5A.

The design presented in accordance with FIG. 5 differs from the design in accordance with FIG. 4 by the fact that the external form of the ring-shaped actuating piston 12A is modified in such a manner that the hydraulic effective areas AS and AB subject to control pressure and operating pressure at the actuating piston for the unlocking of the hydraulic chamber of the shift element 1 are selected in roughly the same size. In this manner, with such a normally closed variant of the first stop valve 5A, only a reduced control pressure for the release of the shift element 1 is necessary. This is because, upon the filling of the shift element by the operating pressure, no reaction forces act at the ramp contour, if the hydraulic effective areas AS and AB are selected in roughly the same size. Thus, the control pressure is independent of the operating pressure, and the control pressure may be selected to be accordingly low.

Furthermore, it is provided that, preferably, the ratio of the hydraulic effective areas between the locking element 9 and the actuating piston 12, 12A should be roughly 1:5 to 1:10.

The second stop valve 6 for filling is always used as a non-return valve, regardless of whether it is used as a first stop valve 5, 5A, a normally open variant or a normally closed variant.

Below, the mode of operation of the first stop valves 5, 5A and the second stop valves 6 of the stop valve assembly in accordance with the invention is described.

The first stop valve 5, 5A is locked through the ramp contour 11. The dynamic pressure acts at the piston area of the ball ramp. The balls or locking elements 9 sit on the tapered section of the ramp contour 11 of the actuating piston 12, 12A, and are pressed into the respective assigned valve seat 10. The hydraulic chamber 2 is locked if the pressure supply from the hydraulic control unit 8 is switched off, by which the operating pressure in the hydraulic chamber 2 of the shift element 1 is locked by the first locking element 5, 5A. So that the locking elements 9 or balls are not opened through their centrifugal force, the balls are subject to a spring force. Thereby, a lowered locking pressure must be maintained. This is calculated from the ratio of areas of the impacted ball areas of the locking element 9 at the axial actuating area of the ramp contour 11, multiplied by the geometric transmission ratio relationship of the ramp contour 11, less the friction force and spring force.

In order to be able to selectively lower the pressure in the hydraulic chamber 2 of the shift element 1, the pressure of the hydraulic control unit 8 must be adjusted to the locked operating pressure. If the pressure difference approaches zero, with the normally open variant, the locking pressure and control pressure can be lowered in such a manner that the actuating piston 12 is pushed back by the disk spring and the spring element 16, and the locking elements 9 fit on the cylindrical part of the ramp contour 11. With the normally closed variant, the control pressure is raised in such a manner that the actuating piston 12 is pushed back against the spring force of the return spring 16, and the locking element 9 fits on the cylindrical part of the ramp contour 11.

The pressure of the hydraulic control unit 8 and the pressure in the hydraulic chamber 2 can now be selectively lowered. One advantage with the synchronization of the pressure is that the first stop valve 5, 5A can synchronize the clutch pressure precisely with the pressure of the hydraulic control unit 8, as soon as the pressure of the hydraulic control unit 8 exceeds the value of the operating pressure.

For the rapid opening of the first stop valve 5, 5A, for example in the event of an error, it is advantageous to rapidly lower the operating pressure in the hydraulic chamber 2 of the shift element 1. For this purpose, with the normally open variant, the control pressure is discharged abruptly (for example, through a steep ramp) and, with the normally closed variant, the control pressure abruptly increases. The pressure of the hydraulic control unit 8 must not build up at the shift element 1 to be switched on.

In the event of an error, if (for example) no pressure of the hydraulic control unit 8 is available, an independent opening is required; that is, if the dynamic pressure is reduced, the spring element 16 pushes the actuating piston 12 into a position in which the locking element 9 can be detached from the valve seat 10 (normally open variant). Thus, the hydraulic agents may flow out of the hydraulic chamber 2, and the traction of the transmission is interrupted by the opening of the shift element 1. In order to be able to open the locking elements 9 against the centrifugal force, and to reach a stable position of the locking elements 9 upon filling, the locking elements 9 are subject to the spring force of an additional spring element 17.

For filling or refilling, the second stop valve 6 always opens if the hydraulic control unit 8 demands a pressure that is greater than the clutch pressure present in the hydraulic chamber 2. Thus, the pressure can be raised at any time (drag indicator principle).

Modifications and variations can be made to the embodiments illustrated or described herein without departing from the scope and spirit of the invention as set forth in the appended claims.

REFERENCE SIGNS

1 Shift element
2 Hydraulic chamber or hydraulic ring chamber
3 Shaft or transmission shaft
4 Transmission housing
5, 5A First stop valve
6 Second stop valve
7 Supply line
8 Hydraulic control unit or control valve
9 Locking element
10 Valve seat
11 Ramp contour
12, 12A Actuating piston
13 Non-return spring
14 Locking ball
15 Valve seat
16 Spring element or return spring
17 Spring element

The invention claimed is:

1. A stop valve assembly for the locking and unlocking of at least one hydraulic chamber of a shift element that is applied with operating pressure and is coaxially arranged at a shaft in a transmission housing of an automatic transmission of a motor vehicle, the stop valve assembly comprising:
  a plurality of first stop valves for lowering the operating pressure of the shift element; and
  a plurality of second stop valves for raising the operating pressure of the shift element,
    the plurality of first stop valves and the plurality of second stop valves are alternatingly arranged around a circumference of the shift element.

2. The stop valve assembly according to claim 1, wherein the pluralities of first and second stop valves are in a hydraulic supply line and are switched in a manner parallel to each other between a hydraulic control unit and the hydraulic chamber of the shift element.

3. The stop valve assembly according to claim 2, wherein each of the plurality of first stop valves comprises a spring-loaded locking element that is brought into operative connection with a valve seat and a ramp contour of an axially movable actuating piston that is subject to control pressure.

4. The stop valve assembly according to claim 3, wherein an angle of the ramp contour is from 20° to 40°.

5. The stop valve assembly according to claim 1, wherein each of the plurality of second stop valves comprises a non-return valve comprising a locking ball pressed against a valve seat by a non-return spring.

6. The stop valve assembly according to claim 1, wherein the first and second stop valves of the pluralities of first and second stop valves are offset from one another around the circumference of the shift element by an angle of about 60 degrees.

7. The stop valve assembly according to claim 1, wherein each of the plurality of first stop valves comprises a ring-shaped piston chamber that is provided in a radial direction between the transmission shaft and the hydraulic chamber of the shift element.

8. The stop valve assembly according to claim 7, wherein each of the plurality of first stop valves comprises a ring-shaped actuating piston that is movable in an axial direction in the piston chamber.

9. The stop valve assembly according to claim 1, wherein each of the plurality of first stop valves comprises a spring-loaded locking element that is brought into operative connection with a valve seat and a ramp contour of an axially movable actuating piston that is subject to control pressure, each of the plurality of first stop valves is a normally open valve wherein the locking element is subject to control for the locking of the hydraulic chamber of the shift element by being pressed against the valve seat.

10. The stop valve assembly according to claim 9, wherein, for lowering of operating pressure, with a lowering of control pressure to at least one of the plurality of first stop valves, the locking element is brought by a resetting force into an open position of the at least one of the plurality of first stop valves.

11. The stop valve assembly according to claim 1, wherein each of the plurality of first stop valves comprises a spring-loaded locking element that is brought into operative connection with a valve seat and a ramp contour of an axially movable actuating piston that is subject to control pressure, each of the plurality of first stop valves is a normally closed valve wherein the actuating piston is subject to a spring force such that the locking element is pressed against the valve seat by the actuating piston for locking of the hydraulic chamber of the shift element.

12. The stop valve assembly according to claim 11, wherein, for lowering of operating pressure, the actuating piston is subject to control pressure in such a manner that the locking element is brought into an open position of at least one of the plurality of first stop valves.

13. The stop valve assembly according claim 1, wherein each of the plurality of first stop valves comprises a ring-shaped actuating piston that is movable in an axial direction in a piston chamber, the ring-shaped actuating piston comprising hydraulic effective areas having a same size that are subject to control pressure and operating pressure, respectively, for unlocking of the hydraulic chamber of the shift element.

14. The stop valve assembly according claim 13, wherein a ratio of hydraulic effective areas between the locking element and the actuating piston are from 1:5 to 1:10.

* * * * *